United States Patent

Tang

Patent Number: 5,447,068
Date of Patent: Sep. 5, 1995

[54] DIGITAL CAPACITIVE ACCELEROMETER

[75] Inventor: William C. Tang, Colorado Springs, Colo.

[73] Assignee: Ford Motor Company, Dearborn, Mich.

[21] Appl. No.: 221,212

[22] Filed: Mar. 31, 1994

[51] Int. Cl.$^6$ .................................. G01P 15/125
[52] U.S. Cl. .................................. 73/514.32
[58] Field of Search .......... 73/517 AV, 517 B, 517 R, 73/518

[56] References Cited

U.S. PATENT DOCUMENTS

| | | | |
|---|---|---|---|
| 3,784,897 | 1/1974 | Norrie | 323/93 |
| 3,911,738 | 10/1975 | Fischer | 73/141 R |
| 4,177,421 | 12/1979 | Thornburg | 324/61 R |
| 4,553,436 | 11/1985 | Hansson | 73/517 R |
| 4,641,539 | 2/1987 | Vilimek | 73/862.67 |
| 4,711,128 | 12/1987 | Boura | 73/517 B |
| 5,095,752 | 3/1992 | Suzuki et al. | 73/517 R |
| 5,146,389 | 9/1992 | Ristic et al. | 73/517 AV |
| 5,243,861 | 9/1993 | Kloeck et al. | 73/517 R |

*Primary Examiner*—Richard E. Chilcot, Jr.
*Assistant Examiner*—Max H. Noori
*Attorney, Agent, or Firm*—Roger L. May; Allan J. Lippa

[57] ABSTRACT

A capacitive accelerometer includes electrode plates supported and aligned for movement in the direction of a substrate in which they are supported. Preferably, the plates are formed a surface micro machining, and each plate includes capacitor forming surfaces aligned at an acute angle with respect to each other. In addition, each capacitive accelerometer is formed as a differential capacitor so that one movable plate is disposed between to relatively stationary plates and a plurality of stationary and movable plates are aligned in a series along a portion of the substrate. The suspension comprises a cantilevered support arrangement for the plates.

9 Claims, 4 Drawing Sheets

DIGITAL CAPACITIVE ACCELEROMETER

TECHNICAL FIELD

This invention relates generally to accelerometers and, more particularly, to a capacitive accelerometer having one or more resiliently mounted capacitor plates aligned and supported for displacement on a substrate carrying one or more fixed plates.

BACKGROUND ART

Devices for measuring forces in response to capacitor plate movement are shown in U.S. Pat. No. 3,911,738, issued to Fischer. As a force displaces the movable capacitor plate, a responsive displacement signal generates differential electric pulses that indicate the amplitude of the force being measured and that, when applied to the capacitor, electrostatically oppose the force and urge the movable plate toward its original position.

This device uses a capacitive bridge circuit to measure voltage level changes caused by deflection of the plate. When the electrostatic counterbalancing force is generated to restore the plate position, displacement may be reduced by the generated counterbalancing force which may be reduced by electronic signal compensation.

With the use of analog voltage levels, the movable plate should be sufficiently large to generate a detectable signal difference for small displacements. Furthermore, relatively expensive conventional hybrid technology is typically used to fabricate the force-sensing elements.

SUMMARY OF THE INVENTION

The present invention provides an alignment of plate surfaces in a capacitive accelerometer to enhance the linearization between the pull-in voltage and acceleration forces exerted on the movable member. The present invention provides substantially simplified mounting and improved packaging which enables the plates to move in a direction consistent with the plane of the substrate to which the plates are mounted. In addition, a multiple plate version forms one or more differential capacitors fabricated on the substrate and reduces compensation or calibration by signal processing electronics.

The present invention allows an accelerometer to be mounted flat on a vehicle body frame by aligning the sensitivity axis parallel to the mounting substrate. The fabricated plate design follows the general characteristics that $$F_c = \left[ \gamma + \frac{\alpha}{d - \lambda} \right] V_c^2 \quad (1)$$

where $F_c$ is the electrostatic force induced between the two capacitor plates, $V_c$ is the voltage applied between the two plates, d is the capacitor gap, and $\alpha$, $\lambda$, and $\gamma$ are constant parameters for curve fitting purposes. As a result the pull-in voltage may be defined as $$V_p = \left| \frac{\sqrt{\alpha k}}{\gamma} \right| \left[ 1 \mp \sqrt{1 + \frac{\gamma}{\alpha} \left( d_o - \lambda - \frac{Ma}{k} \right)} \right] \quad (2)$$

where the choice between the minus or plus on the right hand turn depends upon the sign of $\gamma$. As a result, each of the movable and fixed plates have two or more surfaces aligned at acute angles to each other.

In addition, the capacitor electrode design that permits plate displacement in a direction parallel to the mounting substrate can be implemented with currently available techniques for fabricating high aspect ratio micro devices. For example, the plates and a suspension for the plates can be fabricated with LIGA (lithographie, galvanoformung, and abformung, where X-ray radiation is used to pattern a thick layer of specialized photoresist followed by electroplating onto the exposed substrate and photoresist stripping to form a final metal structure) or LIGA-like technologies (a photosensitive polyimide is used in conjunction with conventional photolithograph equipments) so that the greatest thickness of plates formed by LIGA technology can be used to increase sensitivity, while the convenience of the other high aspect IC technology permits electro thicknesses in the range of about 5 microns to about 2 microns can be employed at substantially less cost.

Each capacitor is preferably formed as a differential capacitor in which the movable electrode's movement is detected with respect to electrodes positioned on opposite sides of the movable electrode. Accordingly, the preferred embodiment saves additional time and circuitry to calibrate the reaction of a capacitor compared to when an absolute value of a pull-in voltage between a moving and stationary plate is used.

As a result, the present invention provides a unique thin film processed capacitor electrode design that provides lateral sensitivity, and an expanded linear range. The present invention also provides an alternative sensitivity axis to the previously known displacement axis perpendicular to the substrate on which the capacitor is formed. The present invention also provides a digital capacitive accelerometer produced by surface micro machining technology that simplifies both the fabrication of and the mounting requirements for the accelerometer. Moreover, the present invention provides a digital capacitive accelerometer that simplifies the signal processing electronics as an alternative to signal processing electronics.

BRIEF DESCRIPTION OF THE DRAWING

The present invention will be better understood by reference to the following detailed description of the preferred embodiment when read in conjunction with the accompanying drawing in which like reference characters refer to like parts throughout the views and in which.

DETAILED DESCRIPTION OF THE PREFERRED EMBODIMENT

Figure 1:
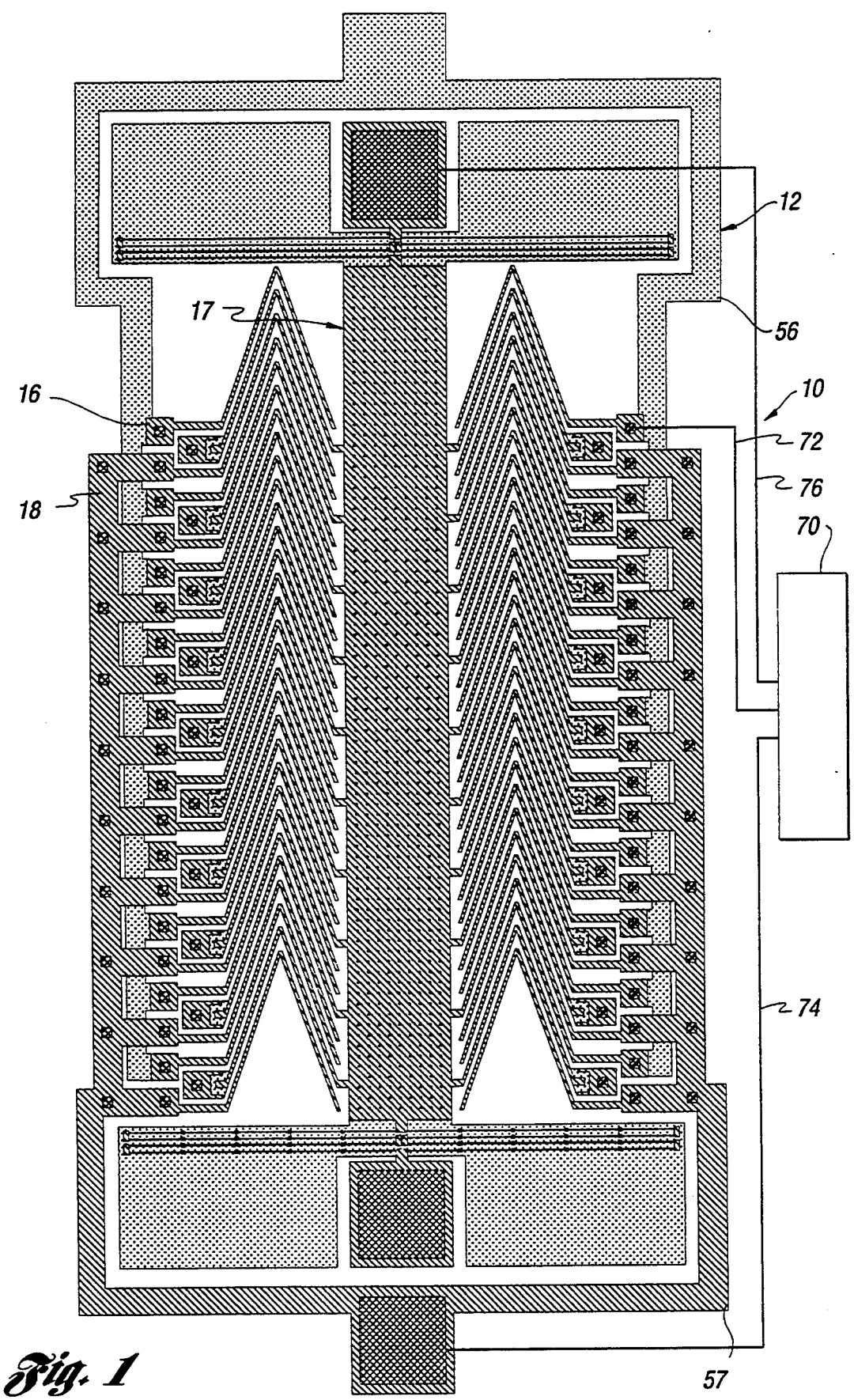
FIG. 1 is a plan view of a digital capacitive accelerometer constructed according to the present invention.

Referring first to FIG. 1, a differential digital capacitive accelerometer 10 is thereshown comprising a bottom conductor 12 secured to a substrate 14 as well as structural conductors 16 and 18. A movable structural conductor 17 is supported by a suspension 22 also to be defined in greater detail. These structures are configured to form left and right series 20 of differential capacitors as will be described in greater detail.

Figure 2:
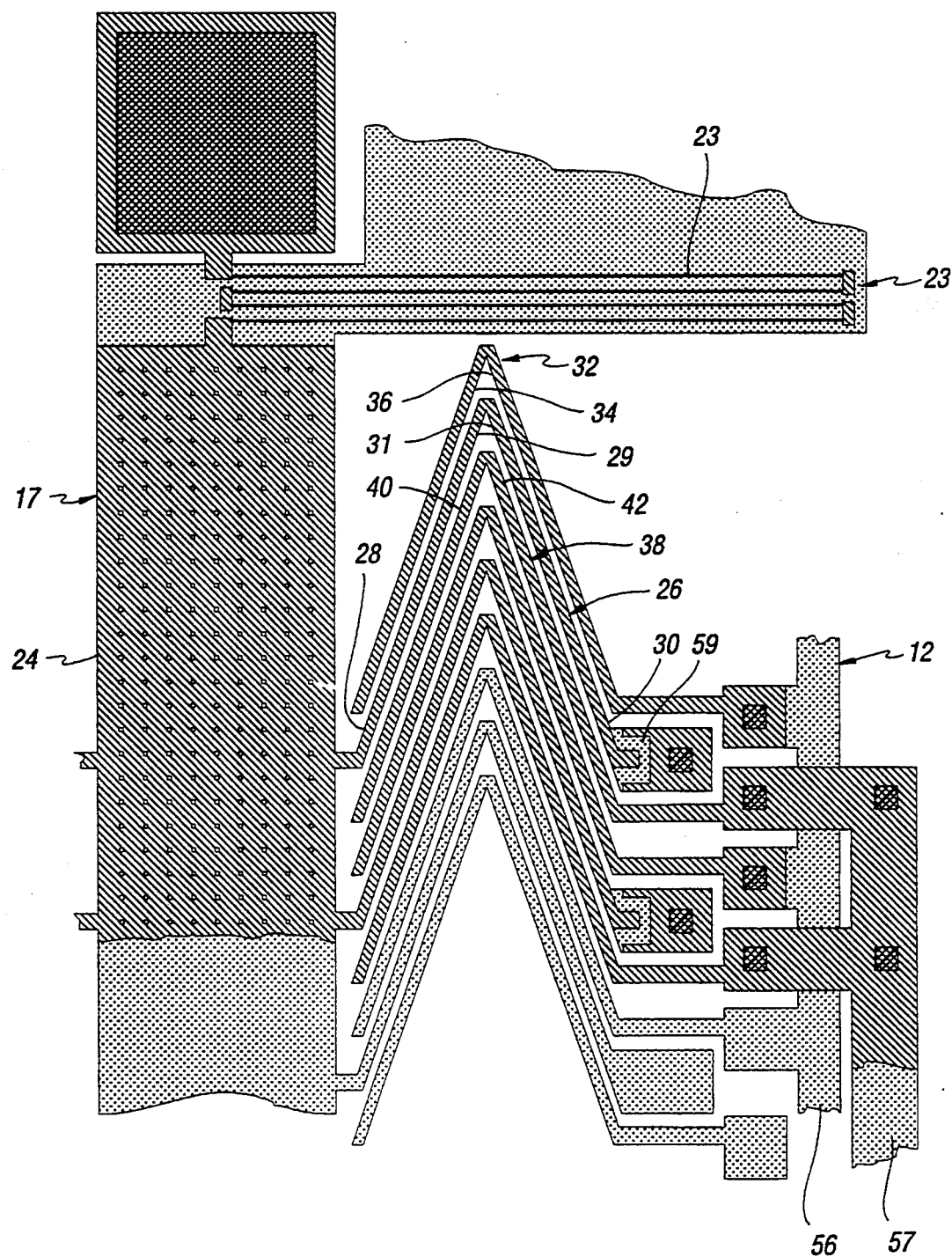
FIG. 2 is an enlarged fragmentary plan view of a portion of the device shown in FIG. 1.

Referring now to FIG. 2, the movable structural conductor 17 includes a common plate 24 that branches into a plurality of plates 26. Each plate 26 has a surface 28 and surface 30 aligned at an acute angle with respect to each other, preferably in the range of 40°–90°. The structural conductor 16 includes a similarly shaped plate 32 having a first surface 34 and a surface 36 aligned at or near the same angle as between the surfaces 28 and 30 of plate 26.

In the preferred embodiment, plates 26 and 32 are combined with a third plate 38 to form a differential capacitive accelerometer. Accordingly, the plate 26 includes a surface 29 opposite a surface 28 and a surface 31 opposite the surface 30 which are likewise aligned at or near the acute angle between surfaces 28 and 30. The plate 38 includes surfaces 40 and 42 that face and are aligned at the same acute angle as a facing surfaces 29 and 31 of plate 26.

Figure 4:
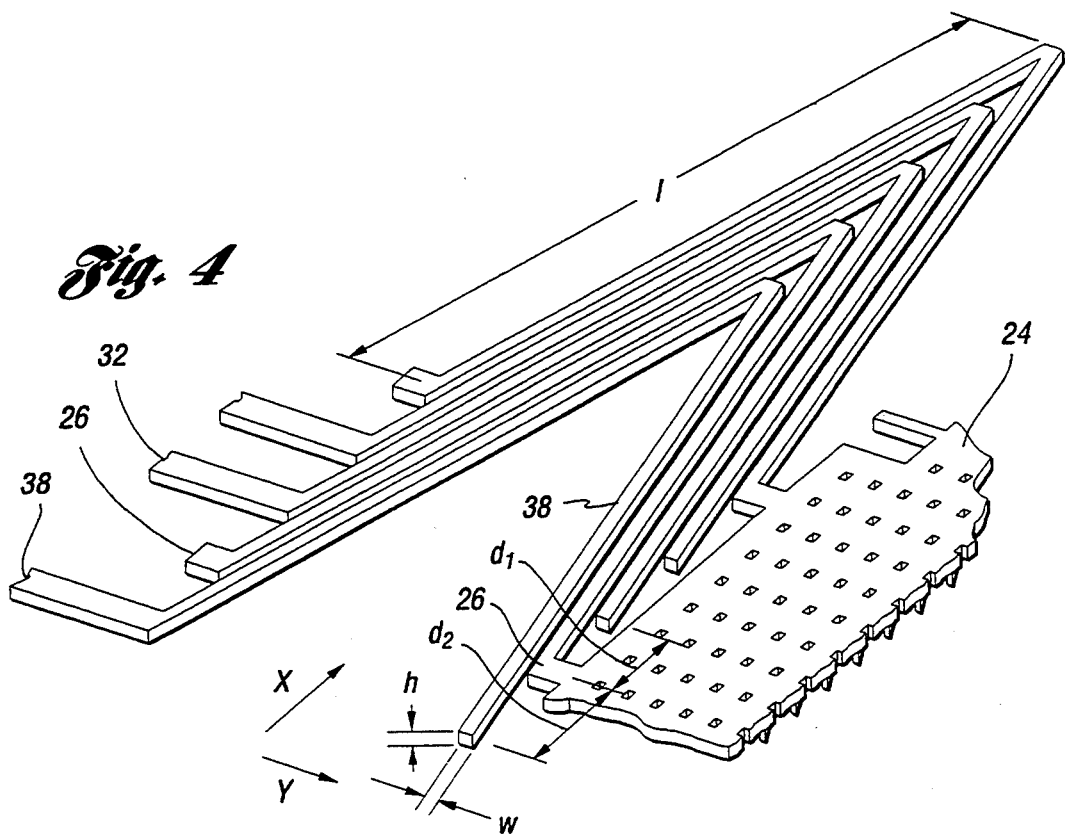
FIG. 4 is an enlarged perspective view of a portion of the accelerometer construction shown in FIG. 2.

FIG. 4 illustrates the new acutely angled electrode design based on the surface-micromachining technology. A three-dimensional electric field simulator is used to obtain the electrostatic force between the two electrodes at a fixed potential. A particular design according to FIG. 1 with l=300 μm, h=5 μm, and θ=40° under a dc bias of V are simulated at different gaps d, yielding the following results:

| d[μm]   | 6.00  | 6.35  | 6.77  | 7.29  | 8.86  | 10.11 | 11.96 | 15.00 |
|---------|-------|-------|-------|-------|-------|-------|-------|-------|
| $F_d$[nN] | 1.285 | 1.158 | 1.034 | 0.910 | 0.639 | 0.507 | 0.381 | 0.267 |

Figure 5:
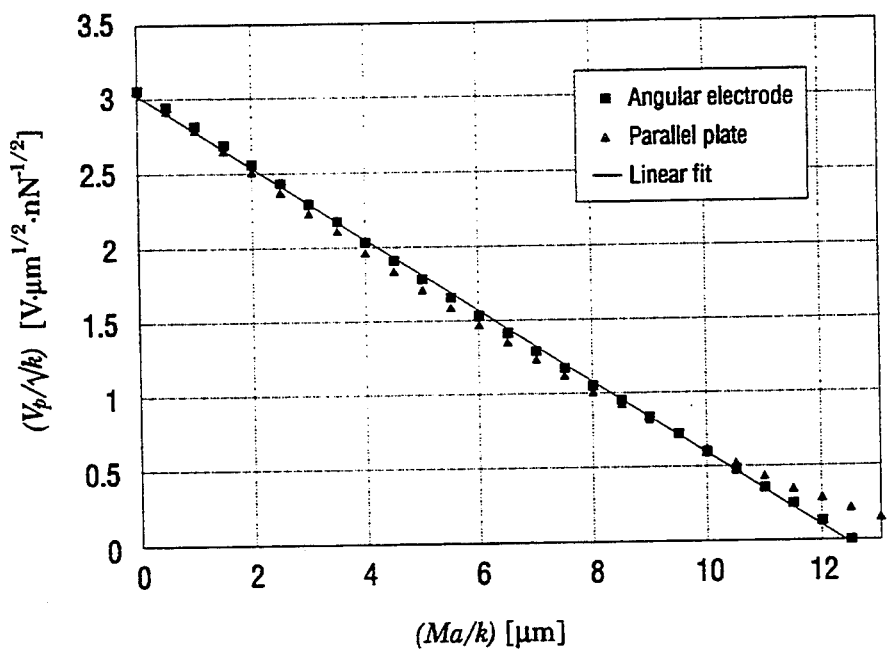
FIG. 5 is a graph representation of linearization between pull-in voltage and acceleration force according to the present invention.

The following fitted parameters are obtained when Eq. (2) is fitted to the above data, with a coefficient of correlation $\gamma^2$ of 0.9997:

$\gamma = -0.140$ nN·V$^{-2}$, $\alpha = 4.970$ nN·μm·V$^{-2}$, and $\lambda = 2.521$ μm The coefficient of correlation indicates a very good fit for the range of 6 μm ≦ d ≦ 15 μm. FIG. 5 is a plot of the fitted results.

Substituting the fitting parameters and ($d_O$=15 μm) into Eq. (3) gives where (Ma/k) is in unit of [μm] and $V_p/\sqrt{k}$) in [V·μm$^{\frac{1}{2}}$·nN$^{-\frac{1}{2}}$].

$$V_p = \left| \frac{\sqrt{\alpha k}}{\gamma} \right| \left[ 1 \mp \sqrt{1 + \frac{\gamma}{\alpha}\left(d_o - \lambda - \frac{Ma}{k}\right)} \right] \quad (3)$$

$$\frac{V_p}{\sqrt{k}} = \frac{\sqrt{4.970}}{0.140}\left[1 - \sqrt{1 - \frac{0.140}{4.970}\left(15 - 2.521 - \frac{Ma}{k}\right)}\right] \quad (4)$$

$$\frac{V_p}{\sqrt{k}} \approx 15.924 - 2.673\sqrt{\frac{Ma}{k} + 23.021} \quad (5)$$

In contrast, a parallel-plate design, without signal processing compensation, is analyzed with identical k, $d_O$, and M as the angular electrode. A comparable capacitor plate area A is chosen such that ($V_p/\sqrt{k}$) under zero acceleration matches that of the latter. Thus, Eq (1) gives $$V_p = B\left(d_o - \frac{Ma}{k}\right)^{\frac{3}{2}} \quad (6)$$

$$\frac{V_p}{\sqrt{k}} = \frac{(15.924 - 2.673\sqrt{23.021})}{15^{3/2}}\left(15 - \frac{Ma}{k}\right)^{\frac{3}{2}} \quad (7)$$

$$\frac{V_p}{\sqrt{k}} \approx 0.0533\left(15 - \frac{Ma}{k}\right)^{\frac{3}{2}} \quad (8)$$

Both Eqs. (4) and (5) are plotted in FIG. 5 for comparison, which shows that the angular electrode design has a better linear fit than the parallel-plate one before signal processing compensation.

FIG. 4 and 5 illustrate an example in which the angular electrodes are used in a laterally-sensitive accelerometer. The doubly-folded beam design [6] provides high cross-axis sensitivity rejection. The system is compliant in the lateral x direction and is very stiff in the lateral y direction. Out-of-plain (z) motion is impeded effectively by squeeze-film damping between the structure and the substrate. Because the thickness of the structure is limited by processing constraints, multiple electrodes are connected in parallel to boost sensitivity and to lower drive requirement. The two sets of interconnected electrodes (labelled as "forward electrodes" and "backward electrodes") operate differentially. Any acceleration in the x direction is sensed as the difference between the pull-in voltages from the two electrode sets, eliminating the dependence on certain processing parameters. The differential approach also double the sensitivity of the system in the x direction. Limit stops 44 are included in the design. Layer sections 56, 57, and 59 of base 12 may be used throughout the design to isolate the movable structures from vertical (in the direction perpendicular to plane of the substrate 14 surface) electrostatic force.

Fabrication of this device can be done with surface-micromachining technique, which is currently available in the microfabrication facility at Ford Research Laboratory. Thickness of 5 μm for the structural conductors can be achieved with deposited polycrystalline silicon (poly), and 3 μm of sacrificial layer (low-temperature deposited silicon oxide) which defines the separation of the structural poly from the substrate can also be done. Etch holes (FIG. 4) are opened in the center plate (proof mass) because of processing requirement. During the final removal of the sacrificial layer with wet chemical etchant, the etch holes drastically speed up the etching process by allowing distributed access to the sacrificial oxide underneath the plate. Finally, tiny dimples (typically 2 μm×2 μm) are distributed throughout the suspended structures to alleviate adhesion between the structures and the substrate.

Surface micromachining is a process by which micromechanical structures are built on the surface of a substrate, mainly by depositing and patterning layers of thin films. Many of the standard IC planar technology processes can be adopted to build surface microstructures, such as photolithography, thin-film deposition, wet chemical and dry plasma etching. The thin-film structural materials are carefully chosen for both their mechanical properties required for the specific functions in the finished structures, as well as the ease with which the structure can be precisely created.

The core processing steps in surface micromachining can be illustrated with the electrostatically driven microcantilever (FIG. 3). A starting silicon wafer substrate 14 is first passivated with dielectric layers for protection from subsequent processes as well as electrical isolation in the finished structures. The dielectric layers are usually silicon oxide, thermally grown to a thickness of 0.1 to 0.3 μm as at 52, which is then covered with 0.1 to 0.15 μm of low-pressure chemical-vapor deposited (LPCVD) silicon nitride layer as at 54.

A thin layer 56 (FIG. 3b) of polycrystalline silicon (polysilicon) 0.1 to 0.3 μm-thick, is laid down on top of the nitride layer by LPCVD. The electrical conductivity of this layer can be raised by in-situ doping, which is a step where phosphorus atoms are introduced and incorporated into the film during film formation. An alternative is to either diffuse or implant phosphorus into the film after the latter is formed. This is then followed by the first photolithography step, where conventional photoresist used in integrated circuit construction, applied with a typical thickness layer of for example, 1 μm is spun on and patterned to form the etch mask. The wafer is then etched with fluorine- or chlorine-based plasma, which attacks the unprotected areas 58 of the polysilicon layer until the underlying nitride layer 54 is exposed. The bottom electrode is then formed after the photoresist mask is stripped at 58.

A spacer layer 60 of 1 to 3 μm-thick phosphosilicate glass (PSG) is then deposited by LPCVD and patterned similarly with photoresist and plasma etch. This oxide layer can also be etched with wet chemistry such as HF or buffered HF (BHF) solutions. The purpose of this patterning step is to open up contact holes 62 where the subsequently deposited structural layer may be anchored to the substrate.

The structural layer 62 representing 16, 17 or 18 is formed from a 1 to 3 μm-thick polysilicon film, followed by doping and annealing to raise the conductivity and to lower the intrinsic stress within the film. After plasma-etch patterning, the structure is ready to be released (FIG. 3(d)).

Figure 3A:
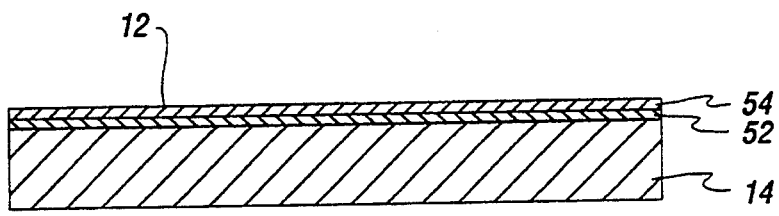
FIGS. 3a–3e show sectional elevational views of sequential steps in a process forming electrodes shown in the accelerometer of FIGS. 1 and 2, while FIG. 3f discloses a plan view of a completed element shown in FIG. 3e.
Figure 3B:
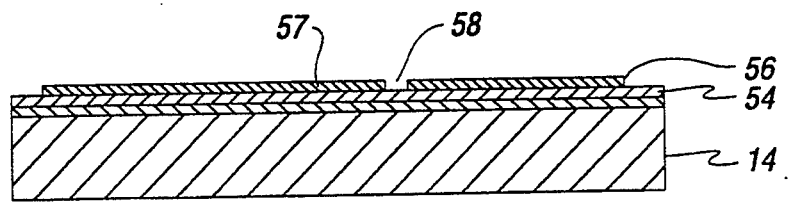
Figure 3C:
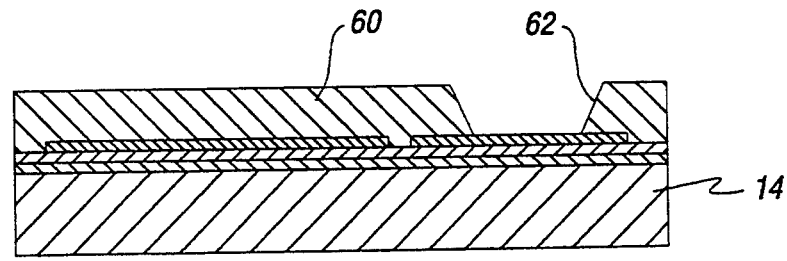
Figure 3D:
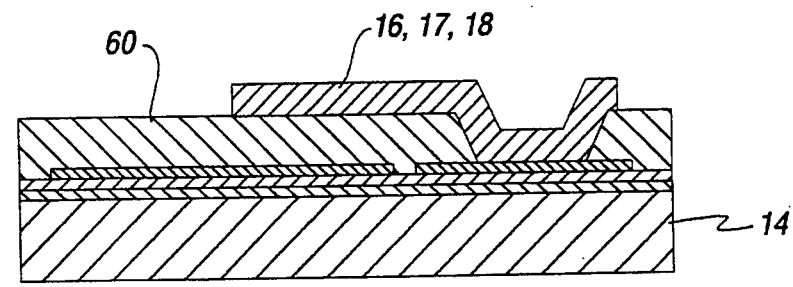
Figure 3E:
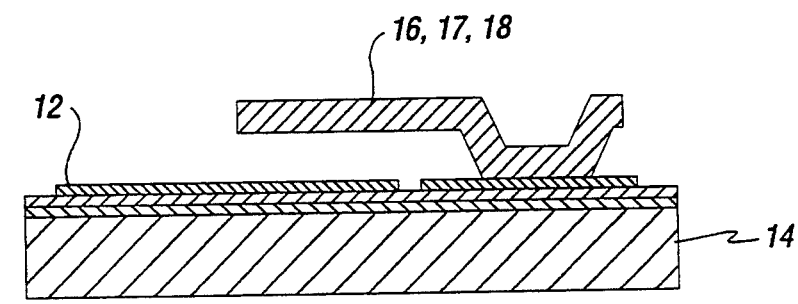

The final step of this surface micromachining sequence is removal of the PSG spacer layer 60 with wet chemistry in either HF or BHF solutions (FIG. 3(e)). This last step is often called sacrificial etch, and the PSG the sacrificial layer, because this spacer layer serves only as an intermediate material to define the spacing between the top and the bottom electrode, and is removed from the final structures.

Figure 3F:
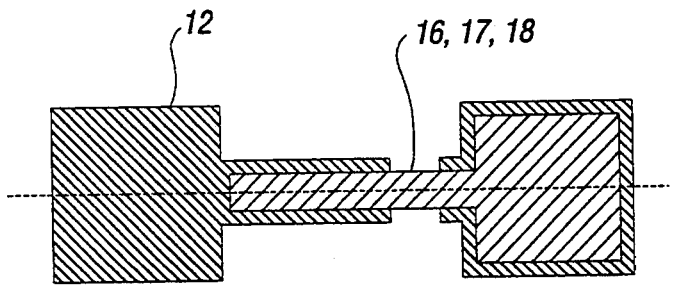

FIG. 3(f) is the top view of the typical structure shown in FIGS. 3a-3e, showing the planar relationship and dimension of the cantilever. When a voltage is applied between the bottom electrode 12 and the anchor, which is electrically connected to the beam representing 16, 17, 18, an electrostatic force will be induced on the beam in the direction towards the bottom electrode. The amount of downward deflection is a function of the magnitude of the applied voltage and the initial gap between the beam and bottom electrode.

The process described above can be used directly to fabricated the device in the invention disclosure. As illustrated in FIG. 4, etch holes 64 are opened on the plate forming the proof mass. This is needed to facilitate the final removal of the sacrificial material, by allowing the etch solution multiple access holes to the sandwiched PSG layer.

The suspension is fabricated in a like manner with a plurality (eight shown in FIG. 1) of beams 23 (FIG. 2). A spring constant can be calculated in the following manner.

$$k_0 = \frac{24EI}{L^3}, \text{ where } I = \frac{h^3 W}{12} \qquad (9)$$
$$= \frac{2Eh^3 W}{L^3}$$

In the foregoing equation, E is Young's modulus (in GPa), W is the thickness of the layer, h is the width of the beam, and L is the length of each supporting beam 23. FIGS. 1 and 2 of the drawing show a top view of a supporting beam 23. The beams permit movement in direction x (FIG. 4) but are very rigid in direction y to prohibit side to side movement of electrode 17. Air damping is sufficient to restrict movement of movable electrode 17 in a direction perpendicular to the plane of substrate 14.

When the wet etching is completed, the structure is rinsed and dried. During the drying step, the flexurally supported plate tends to be pulled down to the substrate and become stuck, due to water surface tension. Therefore, tiny dimples 66 are distributed throughout the underside of the plate to prevent the plate from directly contacting the substrate during drying. After the structure is completely dried, the plate returns to the designed position, with the dimples away from the substrate.

In FIG. 4, the movable electrode 26 can be pulled towards the top electrode 32 if an increasing voltage is applied between them by control 70. The voltage required to cause the electrode to collapse to the top is $V_{p1}$. Similarly, a downward pull-in can be induced by applying $V_{p2}$ between the movable electrode 26 and bottom electrodes 38 by control 70.

When there is no acceleration, the gaps between the movable electrode 26 and the two stationary electrodes 32, 38 are identical, i.e., $$d_1 = d_2 = \qquad (10)$$

In this case, the two pull-in voltages are also identical, i.e., $$V_{p1} = V_{p2} = V_{p0} \qquad (11)$$

or $$\Delta V_p = V_{p1} - V_{p2} = 0 \qquad (12)$$

When the suspended structure experiences force in direction x, it is displaced in direction y, resulting in differential changes in the gaps:

$$d_1 = \frac{d_0}{2} - \Delta d \tag{13}$$

$$d_2 = \frac{d_0}{2} + \Delta d \tag{14}$$

which in turn, cause differential changes in the pull-in voltages:

$$V_{p1} < V_{pO} < V_{p2} \tag{15}$$

or $$\Delta V_p = V_{p1} - V_{p2} < O \tag{16}$$

In actual operation, the top and the bottom electrodes are alternatively activated by a control 70 coupled by conductors 72, 74, 76 to electrode sections 56, 57, and 17 preferably at the anchors. During the first half of the operation cycle, $V_{p1}$ is obtained by applying a voltage across the top electrode 32 and electrode 26; and $V_{p2}$ is obtained during the second half with the bottom electrode 38. The two readings are then compared to obtain $\Delta V_p$.

An obvious advantage is that the information on $V_{pO}$ is not needed to infer acceleration.

Thus even if $V_{pO}$ may drift with time or temperature, no calibration is needed. Another advantage is that during surface-micromachine manufacturing, the precise separations between the two stationary electrodes and the movable one tend to vary simultaneously in the same direction (FIG. 4). Since the two gaps are etched in the same step, any over-etching or under-etching affects both gaps for the same amount. Thus, even $V_{pO}$ varies with etching variance, $\Delta V_p$ remains unaffected as long as $V_{p1}$ and $V_{p2}$ change by the same amount due to simultaneous changes in $d_1$ and $d_2$.

Digital accelerometers disclosed in my U.S. application Ser. No. 07/925,828 can periodically generate a voltage signal, the magnitude of which varies in response to a relatively small displacement of a suspended capacitor plate at a predetermined acceleration. The digital nature of signal generation using the pull-in phenomena offers improved noise immunity.

The movable plate preferably has a large area and thickness that ensures substantial mass so as to react sensitively to movement of the support while the fixed plate has a smaller area to maintain capacitance at a reasonable level to compensate for the larger area sprung plate. When a voltage signal is connected across the fixed plate and the sprung plate to establish an electrostatic force, the pull-in force that urges the sprung plate toward the fixed plate is dependent upon the magnitude of the signal voltage.

In a preferred method and apparatus, a logic control 70, such as a microprocessor, incrementally increases a control signal applied to the capacitive switching device. When the applied voltage reaches the threshold that pulls the sprung plate against the fixed plate, the current pulse generated is used to latch the control signal registering with the applied voltage signal as an indication of the acceleration force imposed upon the switching device. The plates are then released and another incrementing cycle is initiated. The incremented voltage at pull-in is representative of the acceleration force. A preferred arrangement of accelerometers according to my previous application where outputs from each accelerometer are multiplexed in time-phased relationship permits a higher sampling rate.

The present invention expands linearity of the standardized pull-in voltage versus acceleration force as an alternative to the complex signal processing circuits that compensate for non-linearity across a large range of acceleration values and pull-in voltages, as the previous electronic linearization can be expensive to implement. Moreover, while my previous known capacitive accelerometer mountings are complicated by the fact that suspensions for the movable plate permitted movement of the plate in a direction perpendicular to the substrates upon which the capacitor plates may be formed, such structural limitations can substantially effect the packaging of the accelerometers and thus the cost and expense of mounting the previously known accelerometers.

Having thus described the present invention, many modifications thereto will become apparent to those skilled in the art to which it pertains without departing from the scope and spirit of the present invention as defined in the appended claims.

I claim:

1. A capacitive accelerometer comprising:
   a first plate having at least two surfaces aligned at a selected acute angle to each other;
   a second plate having at least two first surfaces aligned at said selected acute angle;
   a substrate having a support surface; and
   a suspension for supporting said plates so that each of said at least two surfaces of said first plate is at a predetermined spacing from a respective one of said at least two surfaces of said second plate, including means for relatively displacing said first and second plates in a direction aligned with the support surface of said substrate.

2. The invention as defined in claim 1 wherein said capacitive accelerometer comprises a plurality of commonly connected said first plates and a plurality of commonly connected said second plates.

3. The invention as defined in claim 1 wherein said second plate includes at least two second surfaces, each second surface facing in an opposite direction from said first surfaces, and further comprising a third plate having at least two surfaces aligned at said selected angle, and wherein said suspension means supports said third plate adjacent said second plate with said second surfaces of said second plate facing said surfaces of said third plate.

4. The invention as defined in claim 1 wherein said suspension comprises a surface micromachined arm cantilevered from an anchor.

5. The invention as defined in claim 1 wherein said suspension comprises moving support for one of said first and second plates, said moving support comprising a plurality of cantilever segments intersecting the direction of movement.

6. A capacitive accelerometer comprising a series of capacitor electrodes on a substrate including a plurality of first plates formed by micromachining on a substrate and including a suspension for supporting the plate for movement in opposed directions parallel to the substrate;
   a plurality of second plates formed by micromachining a plate adjacent one side of each said first plate on a cantilever arm anchored at a first section of electrode on said substrate;

a plurality of third plates formed by micromachining a plate adjacent a second side of said first plate opposite to said one side of said first plate, said third plate being formed on a cantilever arm anchored to a second section of electrode on said substrate, said first and second sections of electrode being separated from each other;

wherein each of said first plates are coupled by a common plate to a first circuit terminal; and wherein said substrate includes a first limit stop for limiting displacement of said first plates toward said second plates, and a second limit stop for limiting displacement of said first plates toward said third plates.

7. The invention as defined in claim 6 wherein said plurality of-first plates comprises a unitary layer and wherein said suspension comprises a plurality of cantilever bars aligned to intersect path of movement in said opposed directions and formed in said unitary layer, wherein said cantilever bars are coupled serially end to end to form a serpentine bar;

one end of said serpentine bar being coupled to said common plate and the other end being anchored to said substrate.

8. The invention as defined in claim 6 wherein each said first plate includes a plurality of first surfaces acutely angled to each other and facing said second plates, and each said first plate having a plurality of second surfaces acutely angled to each other and facing said third plates.

9. An accelerometer comprising:
a substrate;
a base electrode having at least two separated sections carried on said substrate;
a first conductive layer supported above said base electrode, forming a plurality of first plate surfaces;
a second conductive layer supported above said base electrode forming a plurality of second plate surfaces adjacent to and registering with said first plate surface;
a third conductive layer supported above said base electrode forming a plurality of third surfaces adjacent to and registering with said first plate surfaces; and
a suspension for displacing said first surfaces between said second surfaces and said third surfaces in a direction parallel to said substrate;
an anchor for mounting said second layer to a first of said at least two electrode sections;
an anchor for mounting said third layer to a second of said at least two electrode sections; and
wherein said plurality of first plates comprises a unitary layer and wherein said suspension comprises a plurality of cantilever bars aligned to intersect path of movement in said opposed directions and formed in said unitary layer, wherein said cantilever bars are coupled serially end to end to form a serpentine bar;
one end of said serpentine bar being coupled to said common plate and the other end being anchored to said substrate.

* * * * *